United States Patent [19]

Ohuchi

[11] Patent Number: 5,757,685
[45] Date of Patent: May 26, 1998

[54] DATA PROCESSING SYSTEM CAPABLE OF PROCESSING LONG WORD DATA

[75] Inventor: Mitsurou Ohuchi, Tokyo, Japan

[73] Assignee: NEC Corporation, Tokyo, Japan

[21] Appl. No.: 801,730

[22] Filed: Aug. 13, 1996

Related U.S. Application Data

[63] Continuation of Ser. No. 113,202, Aug. 27, 1993, abandoned.

[30] Foreign Application Priority Data

Aug. 31, 1992 [JP] Japan ................. 4-255900

[51] Int. Cl.$^6$ ................................................ G06F 7/38
[52] U.S. Cl. ............... 364/736.01; 364/749; 395/800.01
[58] Field of Search ............... 395/800.01; 364/736.01, 364/749, 786.01, 787.01

[56] References Cited

U.S. PATENT DOCUMENTS

| | | | |
|---|---|---|---|
| 4,604,721 | 8/1986 | Gray | 364/726 |
| 4,707,800 | 11/1987 | Montrone et al. | 364/788 |
| 4,768,160 | 8/1988 | Yokoyama | 364/745 |
| 4,884,231 | 11/1989 | Mor et al. | 364/736 |
| 4,901,268 | 2/1990 | Judd | 364/745 |
| 5,007,009 | 4/1991 | Azetsu | 364/764 |
| 5,032,986 | 7/1991 | Pathak et al. | 711/217 |
| 5,047,975 | 9/1991 | Patti et al. | 364/786 |
| 5,189,636 | 2/1993 | Patti et al. | 364/786 |

*Primary Examiner*—Alyssa H. Bowler
*Assistant Examiner*—Walter D. Davis
*Attorney, Agent, or Firm*—Whitham, Curtis & Whitham

[57] ABSTRACT

An arithmetic and logic operation system capable of performing an arithmetic and logic operation for data longer than one word, includes an arithmetic and logic unit for performing an arithmetic and logic operation for a less significant one-word length portion of the data, and an incrementer/decrementer for incrementing or decrementing of a more significant data portion exceeding the one-word length of the data. A carry signal or a borrow signal generated in the arithmetic and logic unit is supplied to the incrementer/decrementer so that the incrementer/decrementer is controlled so as to selectively increment, or decrement the received data or alternately to output the received data without modification.

8 Claims, 3 Drawing Sheets

DATA PROCESSING SYSTEM CAPABLE OF PROCESSING LONG WORD DATA

This is a Continuation of application Ser. No. 08/113,202 filed Aug. 27, 1993.

BACKGROUND OF THE INVENTION

1. Field of the Invention

The present invention relates to a data processing system, and more specifically to an arithmetic and logic operation system for use in the data processing system and capable of processing data longer than one word.

2. Description of Related Art

In case of performing an arithmetic and logic operation of data in a computer, often the data is processed in units of one word as a fundamental unit. For example, in a 16-bit computer in which each one word is constituted of 16 bits, all of an arithmetic and logic operation circuit, a data bus and a memory are formed in units of 16 bits.

A typical arithmetic and logic operation of a conventional system has been performed as follows: First, two items of data to be subjected to an arithmetic and logic operation are read from a memory and stored in a pair of input temporary registers through a data bus. An arithmetic and logic unit executes a given arithmetic and logic operation between the two items of data set in the pair of input temporarily registers, and the result of the arithmetic and logic operation is stored in an output temporary register. Thereafter, the value stored in the output temporary register is written back to the memory through the data bus. Thus, one arithmetic and logic operation is completed.

In the above mentioned conventional system, since so-called general registers are included in the memory, it is necessary to transfer the data to the input temporary registers before the arithmetic and logic operation is started. However, another arithmetic and logic operation system has been proposed in which the temporary registers are eliminated but the arithmetic and logic unit is coupled directly to a memory which is configured to simultaneously supply two items of data. In any case, the length of the data word is fixed in terms of hardware. Therefore, in the case of processing data longer than one word, the processing has been performed in the following two different manners:

A first manner is that the hardware including the arithmetic and logic unit and the data bus is constituted to have the width of one word, but data of two words or more is processed in a software manner. For example, in the case of performing an increment/decrement of two-word data, a lower half or less significant word portion of the data is first processed, and if a carry or borrow is generated in the processing of the less significant word, an upper half or more significant word of the data is modified on the basis of the carry or borrow generated.

This method is realized in most of the computers. Dyadic operation such as subtraction and addition can be performed in a similar manner. Namely, the two items of data are added or subtracted in a less significant word and in a more significant word separately from each other, and the more significant word is modified on the basis of a carry or borrow from the less significant word.

A second manner is to design the hardware to match the maximum word length to be processed. Namely, if 32 bits are the maximum word length, a 32-bit arithmetic and logic unit, a 32-bit data bus and a 32-bit memory are prepared. However, often the length of one word is actually determined in consideration of an intended application so as to obtain an optimum cost performance, and exceptional applications are realized in a software manner.

The above mentioned software manner is less expensive than the above mentioned hardware manner, but the processing speed is considerably lower than the hardware manner. For example, in the case of performing an increment/decrement of two-word data as mentioned hereinbefore, (1) a less significant word of the data is first processed, (2) whether or not a carry or borrow is generated in the less significant word processing is checked, (3) the less significant word is stored, (4) if a carry or borrow is generated, a more significant word of the data is loaded, (5) the more significant word of the data is incremented or decremented, and (6) the incremented or decremented more significant word is stored. Accordingly, assuming that each of the above mentioned six steps is performed in one cycle, the processing needs six cycles when a carry or borrow is generated. If this processing is realized by hardware, all the processings can be performed in only one cycle. Therefore, the processing time of the software manner is six times more in the worst case.

On the other hand, the hardware manner can have high performance, but is more expensive than the software manner. In addition, since the data length processed in the arithmetic and logic operation system becomes long, a propagation of a carry signal or a borrow signal from a less significant bit toward a more significant bit in the process of the arithmetic and logic operation, will become a critical path, and therefore, it becomes difficult to elevate the operation speed of the overall system including the arithmetic and logic operation system.

SUMMARY OF THE INVENTION

Accordingly, it is an object of the present invention to provide an arithmetic and logic operation system which has overcome the above mentioned defect of the conventional one.

Another object of the present invention is to provide an arithmetic and logic operation system which can be realized with a reduced hardware cost and which can perform a necessary processing at an increased speed.

Here, the arithmetic and logic processing performed in the computer can be divided into two, namely, a calculation of an operand address and an arithmetic and logic operation of data. The operand address calculation is performed for calculating an address of the memory where data to be processed is stored, and therefore, the bit length to be processed is determined by the size of an address space to be accessed. In the arithmetic and logic operation of data, on the other hand, the bit length to be processed is dependent upon a dynamic range required as the data. In recent applications, the arithmetic and logic operation of data is sufficient if the bit length is 16 bits, but the address space often exceeds 64 Kbytes, and therefore, it has become necessary to perform the operand address calculation in a 24-bit length or in a 32-bit length.

In addition, if it is assumed that the operand address calculation and the arithmetic and logic operation of data are independent of each other, the two operations are not necessarily required to be the same kind of operation. Namely, it is sufficient if a required minimum bit length of the arithmetic and logic operation can be realized for each of the operand address calculation and the arithmetic and logic operation of data. The arithmetic and logic operation of data needs an arithmetic operation of four fundamental rules and a logical operation, while the operand address calculation can be realized by only an addition/subtraction operation in view of its nature. For example, considering an instruction system in which the operand address is obtained by a calculation based on a base address of 24 bits and an offset of 16 bits, various kinds of arithmetic and logic operations are required for the least significant 16 bits, namely, the least significant one-word, but the processing for the most significant 8 bits, namely, the most significant half-word can be realized with only the increment or decrement.

The above and other objects of the present invention are achieved, on the basis of the above mentioned conception, by an arithmetic and logic operation system in accordance with the present invention configured to be able to perform an arithmetic and logic operation for data longer than one word, the system including a first arithmetic and logic operation means for performing an arithmetic and logic operation for a less significant one-word length portion of the data, a second arithmetic and logic operation means for performing an arithmetic and logic operation for a more significant data portion exceeding the one-word length of the data, and a propagation means for propagating a carry signal or a borrow signal generated in the first arithmetic and logic operation means, to the second arithmetic and logic operation means so that the second arithmetic and logic operation means performs its arithmetic and logic operation in receipt of the carry signal or the borrow signal generated in the first arithmetic and logic operation means.

Preferably, the arithmetic and logic operation system also includes a control means for controlling the first and second arithmetic and logic operation means in such a manner that after the arithmetic and logic operation of the first arithmetic and logic operation means has been completed, the more significant portion exceeding the one-word length of the data and the carry signal or the borrow signal are supplied to the second arithmetic and logic operation means.

With the above mentioned arrangement, necessary and sufficient kinds of arithmetic and logic operations are ensured for the operand address calculation and can be performed in an optimum bit length, while necessary and sufficient kinds of arithmetic and logic operations are ensured for the arithmetic and logic operation of data and can be performed in an optimum bit length. Thus, the cost increase can be minimized in comparison with the conventional software manner, and a performance at least equal to the conventional hardware manner can be obtained.

The above and other objects, features and advantages of the present invention will be apparent from the following description of preferred embodiments of the invention with reference to the accompanying drawings.

DESCRIPTION OF THE PREFERRED EMBODIMENTS

Figure 1:
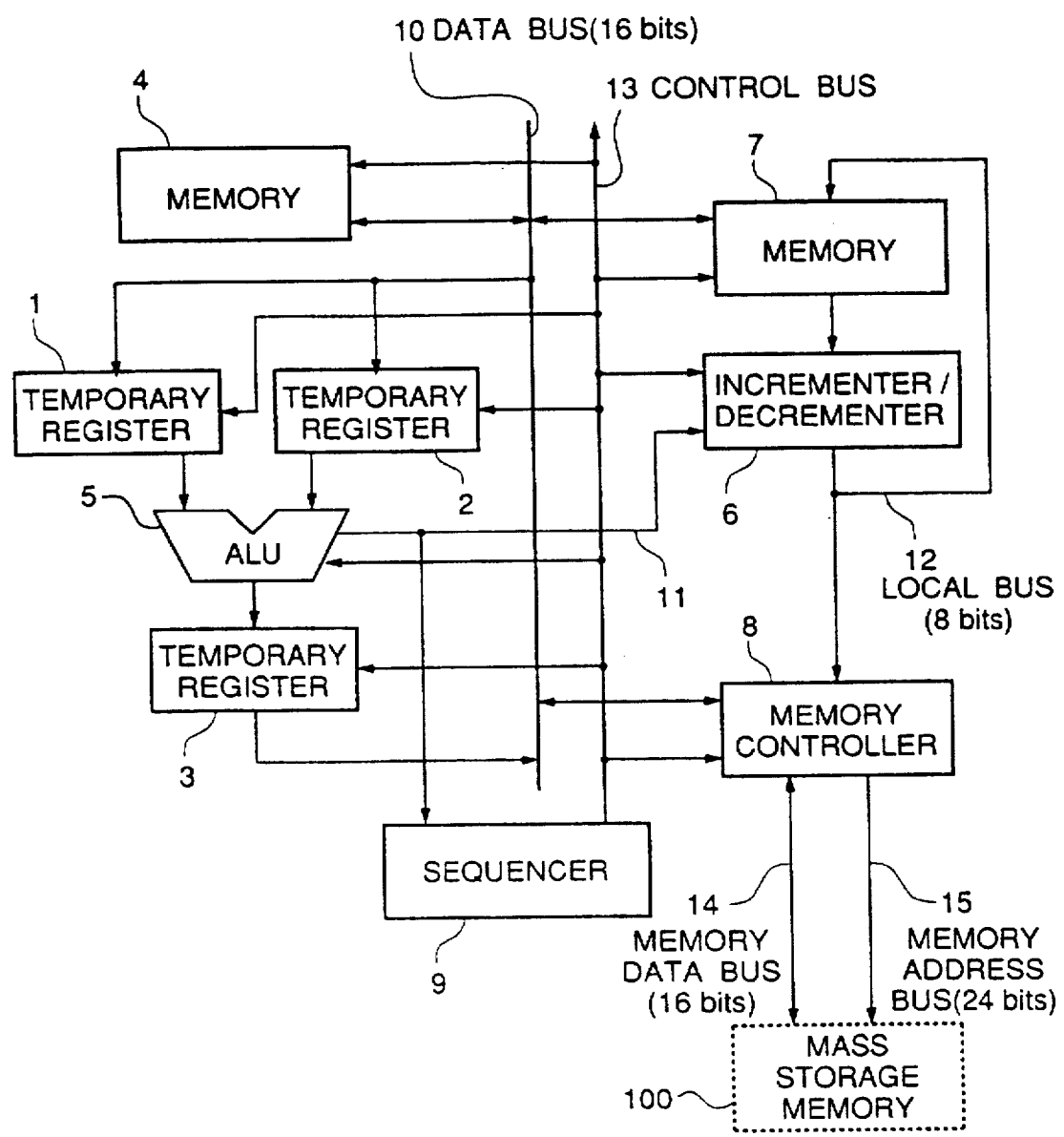
FIG. 1 is a block diagram of a first embodiment of the arithmetic and logic operation system in accordance with the present invention.

Referring to FIG. 1, there is shown a block diagram of a first embodiment of the arithmetic and logic operation system in accordance with the present invention. The shown arithmetic and logic operation system is configured in such a manner that a one-word length is 16 bits and constitutes a basic unit for an arithmetic and logic operation of data, and an operand address calculation is performed in units of 24 bits at a maximum.

As shown in FIG. 1, the arithmetic and logic operation system includes a pair of input temporary registers 1 and 2 each coupled to a data bus 10 so as to receive data through the data bus 10. The input temporary registers 1 and 2 are also coupled to a pair of inputs of an arithmetic and logic unit (abbreviated to "ALU" hereinafter) 5, respectively. An output of the ALU 5 is coupled to an output temporary register 3, which is in turn connected to the data bus 10. To the data bus 10, a memory 4 is also coupled.

The shown arithmetic and logic operation system also includes an incrementer/decrementer 6 having an input connected to an output of another memory 7 and an output connected through a local bus 12 to an input of the memory 7 and a memory controller 8. This memory controller 8 is coupled to a mass storage memory 100 through a memory data bus 14 and a memory address bus 15.

All of the above mentioned elements 1, 2, 3, 4, 5, 6, 7 and 8 are controlled by a sequencer 9 through a control bus 13. Namely, the sequencer 9 operates in accordance with a program so as to generate various control signals for controlling respective operations of the temporary registers 1, 2 and 3, the memory 4, the ALU 5, the incrementer/decrementer 6, the memory 7 and the memory controller 8. More specifically, the sequencer 9 outputs an address and a read/write control signal through the control bus 13 to the memories 4 and 7 when these memories are accessed, and further generates a read/write control signal for each of the temporary registers 1, 2 and 3, an operation kind designation signal for the ALU 5 and the incrementer/decrementer 6, and various control signals for the memory controller 8.

In addition, the ALU 5 generates a carry signal, a borrow signal, a zero detection signal, and a sign signal, which are supplied through signal lines 11 to the sequencer 9, so that these signals are referred to by the sequencer 9 for a conditional branch of the program. The carry or borrow signals are also supplied through the signal lines 11 to the incrementer/decrementer 6.

A program for driving the sequencer 9 is a so called horizontal microprogram, in which an instruction word is mainly divided into two fields: a first field is allocated for controlling a unit composed of the temporary registers 1, 2 and 3, the memory 4 and the ALU 5, and a second field is allocated for controlling another unit composed of the incrementer/decrementer 6, the memory 7 and the memory controller 8.

In the shown embodiment, the temporary registers 1, 2 and 3, the memory 4, the ALU 5, the data bus 10 and the memory data bus 14 are constituted of a 16-bit length, and the incrementer/decrementer 6, the memory 7 and the local bus 12 are constituted of a 8-bit length. In addition, the memory address bus 15 is constituted of a 24-bit length.

Now, operation of the operand address calculation will be described. Here, it is to be noted that the memory 4 is stored with programs and data, but no data is previously stored in the memory 7. Data stored in the memory 4 or data stored in the mass storage memory 100 is transferred and stored in the memory 7 through the data bus 10 under control of the sequencer 9. In ordinary cases, it is programmed to set the memory 7 before the address calculation of the most significant 8 bits is executed. In addition, it is possible to freely access the memory 7 through the data bus 10 under control of the sequencer 9.

First, the least significant one-word of a pair of items of data to be processed (for example, the least significant 16 bits of a 24-bit base address and the whole of a 16-bit offset for an operand address calculation) is read from the memory 4, and written to the temporary registers 1 and 2 through the data bus 10, respectively. When the two temporary registers 1 and 2 have been written with the data to be processed, the ALU 5 performs the arithmetic and logic operation of the kind designated through the control bus 13 from the sequencer 9. The result of the arithmetic and logic operation is stored in the temporary register 3.

Thereafter, the value stored in the temporary register 3 is written back to the memory 10 through the data bus 10. Thus, the processing for the least significant one-word is completed.

In the above mentioned operation, the writing operation of the temporary registers 1, 2 and 3 is executed at a time where the corresponding write control signal on the control bus 13 is activated. In addition, an address for the memory 4 to be accessed and a read/write control signal for the memory 4 are supplied through the control bus 13.

When the arithmetic and logic operation for the less significant word of a one-word length is executed, a carry signal or a borrow signal generated in the course of the execution of the arithmetic and logic operation is supplied through the signal lines 11 to the incrementer/decrementer 6. This incrementer/decrementer 6 receives data of one byte (for example, the most significant 8 bits of the 24-bit base address for the operand address calculation) from the memory 7 selected by an address supplied on the control bus 13, and if the carry signal is active, the incrementer/decrementer 6 increments the received data of one byte. If the borrow signal is active, the incrementer/decrementer 6 decrements the received data of one byte. If neither the carry signal nor the borrow signal is active, the incrementer/decrementer 6 outputs the received data of one byte without modification. The output of the incrementer/decrementer 6 is written back to the memory 7 through the local bus 12.

Figure 2:
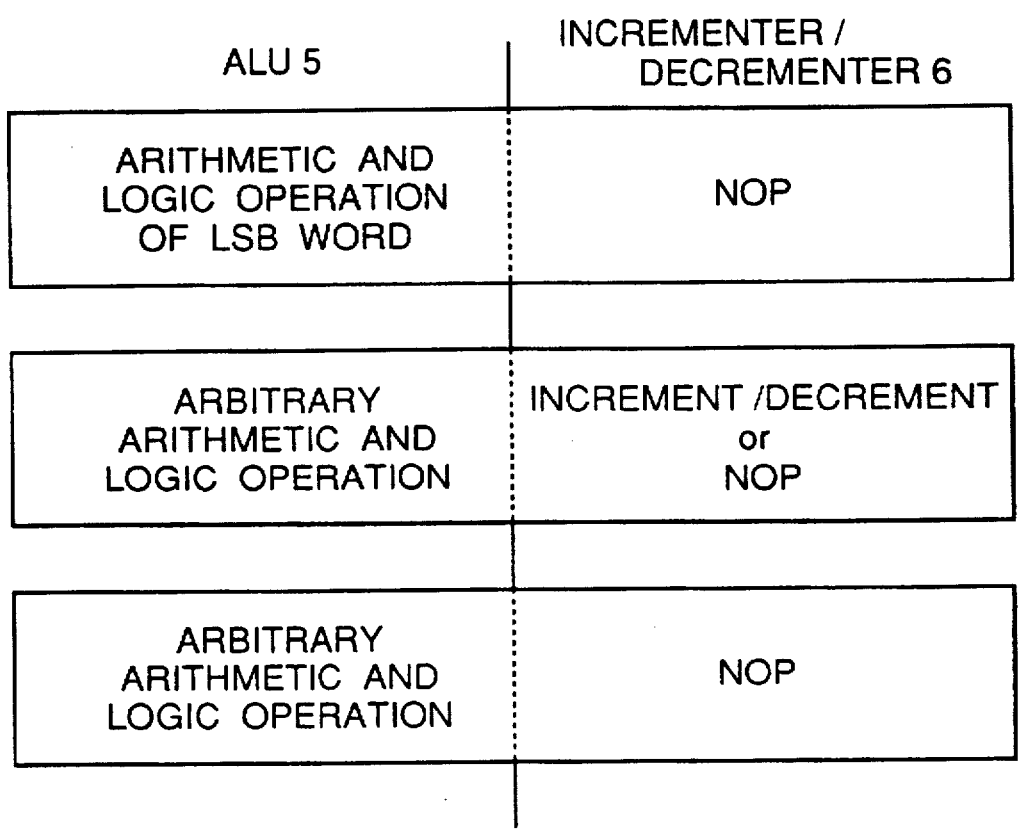
FIG. 2 illustrate a software sequence performed in the arithmetic and logic operation system shown in FIG. 1.

Now, the timing of the operation will be described with reference to FIG. 2, which illustrates operation of the ALU 5 and operation of the incrementer/decrementer 6 in parallel. In a first cycle, the arithmetic and logic operation is executed for the least significant one-word, and in a next cycle, the incrementer/decrementer 6 immediately performs the increment/decrement for the most significant half-word if a carry or a borrow had occurred in the arithmetic and logic operation for the least significant one-word. However, if neither a carry nor a borrow had occurred, the incrementer/decrementer 6 performs no operation. In this cycle, since the memory 7 supplies the half-word data for the incrementer/decrementer 6, it is not possible to access the memory 7 through the data bus 10. However, the unit including the ALU 5 can operate independently of the unit including the incrementer/decrementer 6. In other words, the unit including the ALU 5 and the unit including the incrementer/decrementer 6 perform a two-stage pipelined processing.

As explained above, the arithmetic and logic operation of the least significant one-word length data portion or the least significant 16 bits is executed in a left half of FIG. 1 including the ALU 5 as its central part, and the operation of a data portion exceeding one word, namely, the most significant 8 bits is executed in a right half of FIG. 1 including the incrementer/decrementer 6 as its central part. Accordingly, the operand address calculation of 24 bits can be performed in parallel in the left half of FIG. 1 for the least significant 16 bits and in the right half of FIG. 1 for the most significant 8 bits.

The operand address of 24 bits is used when a mass storage memory is accessed. The operand address of 24 bits is generated in the memory controller 8, and then, supplied through the memory address bus 15 of 24 bits to the mass storage memory 100. For this purpose, the memory controller 8 fetches the data stored in the memory 4 or in the temporary register 3 through the data bus 10 as the least significant 16-bit address, and the most significant 8-bit address through the local bus 12 from the incrementer/decrementer 6. The least significant 16-bit address and the most significant 8-bit address are combined so as to constitute a 24-bit address, which is supplied through the memory address bus 15 to the mass storage memory 100.

Data to be written into the mass storage memory 100 is fetched to the memory controller 8 through the data bus 10 from either the memory 4 or the temporary register 3, and then, supplied from the memory controller 8 through the memory data bus 14 to the mass storage memory 100. On the other hand, data read out from the mass storage memory 100 is supplied through the memory data bus 14 to the memory controller 8, and then stored in a designated one of the memories 4 and 7 and the temporary registers 1 and 2 through the data bus 10.

Figure 3:
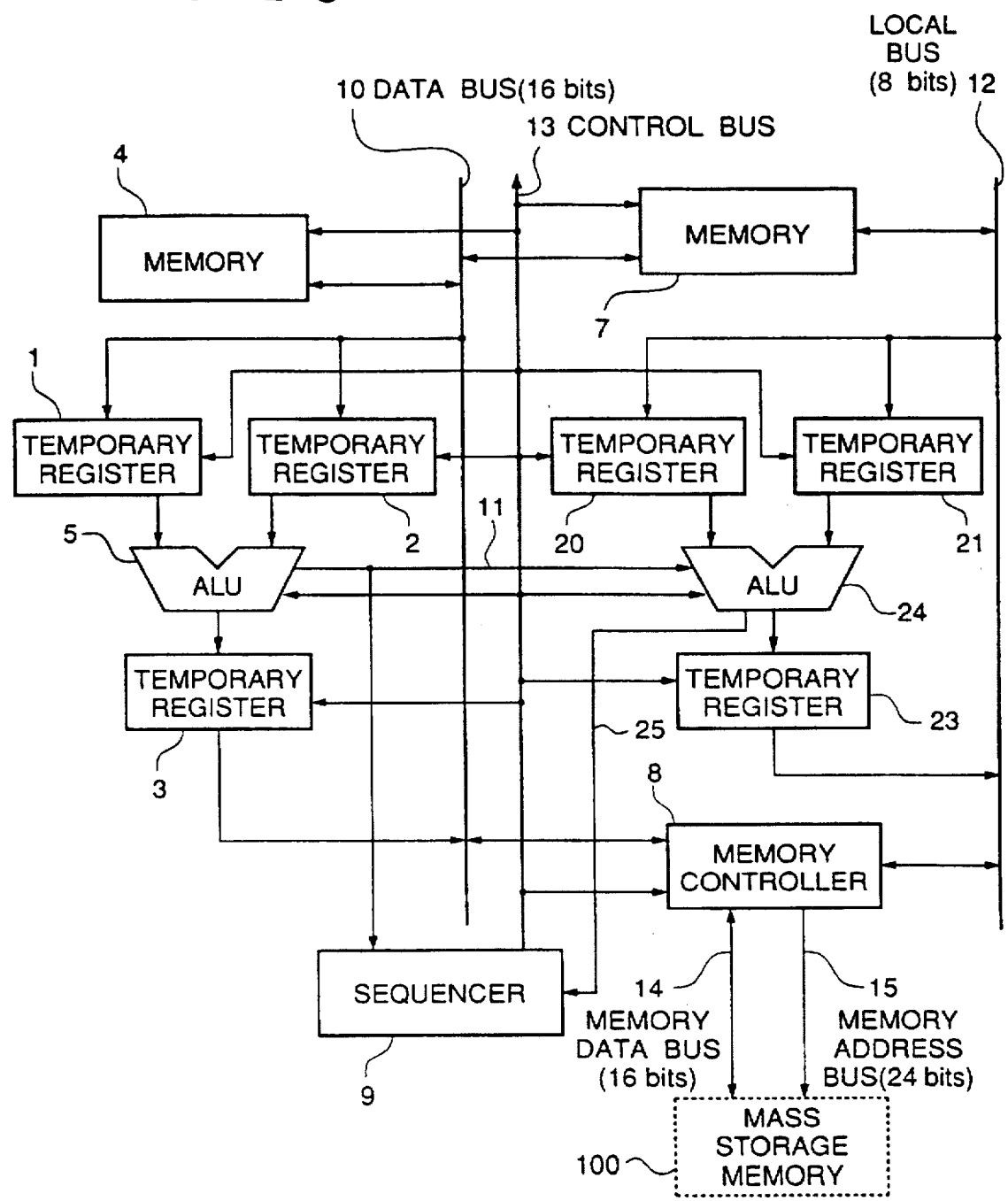
FIG. 3 is a block diagram of a second embodiment of the arithmetic and logic operation system in accordance with the present invention.

Referring to FIG. 3, there is shown a block diagram of a second embodiment of the arithmetic and logic operation system in accordance with the present invention. The second embodiment is characterized in that the incrementer/decrementer of the first embodiment is replaced with an arithmetic and logic operation circuit capable of executing a dyadic operation. Therefore, in FIG. 3, elements similar or corresponding to those shown in FIG. 1 are given the same Reference Numerals, and explanation thereof will be omitted.

A left half of the system shown in FIG. 3 is the same as the left half of the system shown in FIG. 1. A right half of the system shown in FIG. 3 includes a pair of input temporary registers 20 and 21 each having its input connected to the local bus 12 and its output connected to an input of an ALU 24. An output of the ALU 24 is connected to an output temporary register 23, which has its output connected to the local bus 12. Thus, data can be transferred through the local bus 12 between the memory 7 and the temporary registers 20, 21 and 23. Accordingly, the right half of the system shown in FIG. 3 is very similar to the left half of the system shown in FIG. 3 including the ALU 5 as its central part, but different in that the right half of the system shown in FIG. 3 is constituted to have a bit width of 8 bits, similarly to the right half of FIG. 1; and the signal lines 11 from the ALU 5 are connected to ALU 24.

Now, operation will be described. Since the processing for the least significant 16 bits is the same as that of the first embodiment, the processing for the most significant 8 bits performed in the right half including the ALU 24 as its central part will be described.

First, data read from the memory 7 is supplied through the local bus 12 and written into the temporary registers 20 and 21. The read/write control of each of the memory 7 and the temporary registers 20 and 21 is executed at a time where a corresponding control signal on the control bus 13 is activated by the sequencer 9 in accordance with a program.

The data stored in the temporary registers 20 and 21 are supplied to the ALU 24 as its dyadic operation data, and the carry signal or the borrow signal on the signal lines 11 generated from the ALU 5 is used as a carry/borrow input of the least significant bit in the ALU 24. At this time, the kind of arithmetic and logic operation to be performed in the ALU 24 is designated by signals on the control bus 12 supplied from the sequencer 9. The result of the arithmetic and logic operation is stored in the temporary register 23 once, and thereafter, transferred through the local bus 12 and stored in the memory 7 or in the temporary register 20 or 21. In addition, the result of the arithmetic and logic operation stored in the temporary register 23, which constitutes the most significant 8 bits of the address, is also supplied through the local bus 12 to the memory controller 8, which also receives through the data bus 10 the data stored in the memory 4 or the temporary register 3 constituting the least significant 16 bits of the address. Thus, a 24-bit address for the mass storage memory 100 is generated in the memory controller 8, similarly to the first embodiment.

The control performed by the sequencer 9 is based on a microprogram, in which an instruction word is mainly divided into two fields, similarly to the first embodiment. Therefore, the left half and the right half of the system shown in FIG. 3 operate independently of each other.

In addition, the sequencer 9 is configured to receive from the ALU 24 a group of signals 25 indicative of the condition of the result of the 24-bit arithmetic and logic operation which is obtained by combination of the result of the least significant 16-bit arithmetic and logic operation and the result of the most significant 8-bit arithmetic and logic operation. Specifically, the group of signals 25 indicate (1) whether or not the result of the 24-bit arithmetic and logic operation is zero, (2) whether the result of the 24-bit arithmetic and logic operation is positive or negative, and (3) whether or not an overflow occurs in the result of the 24-bit arithmetic and logic operation. As mentioned above, the ALU 5 performs the least significant 16-bit arithmetic and logic operation, and the signals indicative of (a) whether or not the result of the least significant 16-bit arithmetic and logic operation is zero, (b) whether the result of the least significant 16-bit arithmetic and logic operation is positive or negative, and (c) whether or not an overflow occurs in the result of the least significant 16-bit arithmetic and logic operation, are supplied through the signal lines 11 to the ALU 24. This ALU 24 performs the most significant 8-bit arithmetic and logic operation, and also generates the group of signals 25 for the result of the 24-bit arithmetic and logic operation, by taking into consideration the result of the least significant 16-bit arithmetic and logic operation. In response to the group of signals 25, the sequencer 9 controls the conditional branch based on the result of the 24-bit arithmetic and logic operation.

The second embodiment can perform the dyadic operation of the 24-bit length by the two independent hardware mechanisms. The second embodiment is more expensive than the first embodiment, but has a feasibility in processing higher than that of the first embodiment.

The above mentioned embodiments have been constructed under the condition that the one-word length is 16 bits and the data portion exceeding the one-word length is 8 bits. However, it would be apparent to persons skilled in the art that even if any word length is selected, the present invention can be realized and a similar advantage can be obtained. Furthermore, various choices can be made about the kind of arithmetic and logic operation. In the first embodiment, the unit for processing the data portion exceeding the one-word length is composed of the incrementer/decrementer so as to be able to perform only the monadic operation. In the second embodiment, on the other hand, the unit for processing the data portion exceeding the one-word length is constituted of the dyadic operation unit so as to have a high versatility.

As mentioned above, the arithmetic and logic operation system in accordance with the present invention can have a processing speed at least equal to a system having an arithmetic and logic operation hardware of a two-word length. But, the arithmetic and logic operation system in accordance with the present invention is inexpensive, since the bus width can be limited to a one-word length, and since the word length of various function units including RAM, ROM, registers and ALU can correspondingly be limited to a one-word length. In comparison with the conventional software manner using the hardware resource of the one-word length, the arithmetic and logic operation system in accordance with the present invention can have a remarkably elevated performance with a small increase of cost. Accordingly, it can improve the cost performance.

The arithmetic and logic operation system in accordance with the present invention is characterized in that the processing for the more significant data portion exceeding the one-word length is executed in parallel to the processing for the less significant data portion of the one-word length, by means of the hardware independent of the hardware for processing the less significant data portion of the one-word length. It can be generally said that if the data length to be processed becomes longer, the propagation of the carry signal becomes the critical path, and the increase of the operation frequency for the overall computer is prevented. In the arithmetic and logic operation system in accordance with the present invention, this problem has been overcome by a pipelined structure in which the processing for the more significant word is executed with a delay of one cycle from the processing for the less significant word. Accordingly, the arithmetic and logic operation system in accordance with the present invention can have the critical path shorter than a conventional system in which the more significant word and the less significant word are processed in bundle by a single arithmetic and logic operation unit, since arithmetic and logic operation bit length of each of the more significant word and the less significant word is short. Therefore, the operation frequency for the overall computer can be increased.

It will be apparent to persons skilled in the art that the present invention can be applied to a system in which the temporary registers coupled to the ALU are removed and the ALU is coupled directly to a register file.

Thus, the above mentioned advantage of the present invention can be obtained independently of the kind of arithmetic and logic operation performed in the arithmetic and logic operation unit and of the format of supplying the data.

The invention has thus been shown and described with reference to the specific embodiments. However, it should be noted that the present invention is in no way limited to the details of the illustrated structures but changes and modifications may be made within the scope of the appended claims.

I claim:

1. An arithmetic and logic operation system for performing an arithmetic and logic operation for data having a length longer than one word, the system including:

first arithmetic and logic operation means for performing an arithmetic and logic operation for a less significant one-word length portion of the data;

second arithmetic and logic operation means for performing an arithmetic and logic operation for a more significant data portion, said more significant data portion being a portion exceeding the one-word length of the data, said second arithmetic and logic operation means being used solely for address calculation;

propagation means for propagating a carry signal or a borrow signal generated in said first arithmetic and logic operation means, to said second arithmetic and logic operation means, so that said second arithmetic and logic operation means performs its arithmetic and logic operation upon receipt of the carry signal or the borrow signal generated in said first arithmetic and logic operation means; and wherein said first arithmetic and logic operation means includes:

a first memory coupled to a data bus and controlled through a control bus, a pair of first input temporary registers coupled to said data bus and controlled through said control bus, a first arithmetic and logic unit having a pair of inputs connected to said pair of first input temporary registers, respectively, and a first output temporary register coupled to an output of said first arithmetic and logic unit and also coupled to said data bus and controlled through said control bus; and said system further including a sequencer for controlling said first memory, said pair of first input temporary registers, said first arithmetic and logic unit and said first output temporary register such that respective least significant one-word length portions of a pair of items of data are read from said first memory and stored through said data bus into said pair of first input temporary registers, respectively, and the arithmetic and logic operation for the least significant one-word length portions of said pair of items of data is executed by said first arithmetic and logic unit, and thereafter, a result of the arithmetic and logic operation is temporarily stored in said first output temporary register and then stored in said first memory through said data bus, said first arithmetic and logic unit generating a carry signal or a borrow signal when a carry or a borrow is generated during the arithmetic and logic operation for the least significant one-word length portions of said pair of items of data executed by said first arithmetic and logic unit, wherein said second arithmetic and logic operation means includes:

a second memory coupled to said data bus and controlled by said sequencer through said control bus, and an incrementer/decrementer having an input connected to an output of said second memory so as to receive said more significant data portion exceeding the one-word length of the data, an output of said incrementer/decrementer being connected to an input of said second memory through a local bus, said incrementer/decrementer receiving said carry signal or said borrow signal from said first arithmetic and logic unit and being controlled by said sequencer through said control bus so that when said carry signal is active, said incrementer/decrementer increments a received data portion, and when said borrow signal is active, said incrementer/decrementer decrements the received data portion, and when neither said carry signal nor said borrow signal is active, said incrementer/decrementer outputs the received data portion without modification, and further including a memory controller coupled to said data bus and said local bus and controlled by said sequencer through said control bus so as to receive and combine the less significant one-word length portion of data from said first arithmetic and logic operation means and said more significant data portion exceeding the one-word length of the data from said incrementer/decrementer so as to output an address having a length longer than one word.

2. A system according to claim 1, wherein each of said first and second arithmetic and logic operation means performs its arithmetic and logic operation independently from one another.

3. A system according to claim 1, wherein processing for said more significant data portion exceeding the one-word length is executed in parallel with processing for the less significant data portion of the one-word length.

4. A system according to claim 1, wherein processing for said more significant data portion exceeding the one-word length is executed with a delay of no more than one cycle from processing for the less significant data portion.

5. An arithmetic and logic operation system for performing an arithmetic and logic operation for data having a length longer than one word, the system including:

a sequencer coupled to a control bus;

a data bus having a bit width corresponding to said one word;

a first arithmetic and logic operation unit including:

a first memory coupled to said data bus and controlled by said sequencer through said control bus, a pair of first input temporary registers coupled to said data bus and controlled by said sequencer through said control bus, a first arithmetic and logic unit having a pair of inputs connected to said pair of first input temporary registers, respectively, and controlled by said sequencer through said control bus, and a first output temporary register coupled to an output of said first arithmetic and logic unit and also coupled to said data bus and controlled by said sequencer through said control bus, so that respective least significant one-word length portions of a pair of items of data are read from said first memory and stored through said data bus into said pair of first input temporary registers, respectively, and an arithmetic and logic operation for the least significant one-word length portion of said pair of items of data is executed by said first arithmetic and logic unit, and thereafter, a result of the arithmetic and logic operation is temporarily stored in said first output temporary register and then stored in said first memory through said data bus, said first arithmetic and logic unit generating a carry signal or a borrow signal when a carry or a borrow is generated during the arithmetic and logic operation for the least significant one-word length portions of said pair of items of data executed by said first arithmetic and logic unit, a second arithmetic and logic operation unit being used solely for address calculation and including:

a second memory coupled to said data bus and controlled by said sequencer through said control bus, and an incrementer/decrementer having an input connected to an output of said second memory so as to receive a more significant data portion, said more significant data portion being a portion exceeding the one-word length of the data, an output of said incrementer/decrementer being connected to an input of said second memory through a local bus, said incrementer/decrementer receiving said carry signal or said borrow signal from said first arithmetic and logic unit and being controlled by said sequencer through said control bus so that when said carry signal is active, said incrementer/decrementer increments a received data portion, and when said borrow signal is active, said incrementer/decrementer decrements the received data portion, and when neither said carry signal nor said borrow signal is active, said incrementer/decrementer outputs the received data portion without modification, and a memory controller coupled to said data bus and said local bus and controlled by said sequencer through said control bus for receiving and combining a less significant one-word length portion of data from said first arithmetic and logic operation unit and said more significant data portion exceeding the one-word length of the data from said incrementer/decrementer so as to output an address having a length longer than one word.

6. A system according to claim 5, wherein each of said first and second arithmetic and logic operation means performs its arithmetic and logic operation independently from one another.

7. A system according to claim 5, wherein processing for said more significant data portion exceeding the one-word length is executed in parallel with processing for the less significant data portion of the one-word length.

8. A system according to claim 5, wherein processing for said more significant data portion exceeding the one-word length is executed with a delay of no more than one cycle from processing for the less significant data portion.

\* \* \* \* \*